United States Patent
Pham et al.

(10) Patent No.: US 8,694,524 B1
(45) Date of Patent: Apr. 8, 2014

(54) PARSING A QUERY

(75) Inventors: Son Pham, Northridge, CA (US); Thu K. Pham, Northridge, CA (US)

(73) Assignee: Teradata US, Inc., Dayton, OH (US)

( * ) Notice: Subject to any disclaimer, the term of this patent is extended or adjusted under 35 U.S.C. 154(b) by 1939 days.

(21) Appl. No.: 11/510,930

(22) Filed: Aug. 28, 2006

(51) Int. Cl.
*G06F 7/00* (2006.01)

(52) U.S. Cl.
USPC ........................................... 707/759

(58) Field of Classification Search
USPC ........................................... 707/759
See application file for complete search history.

(56) References Cited

U.S. PATENT DOCUMENTS

| | | | |
|---|---|---|---|
| 5,640,584 A | 6/1997 | Kandasamy et al. | |
| 5,659,725 A | 8/1997 | Levy et al. | |
| 5,761,657 A | 6/1998 | Hoang | |
| 5,778,355 A * | 7/1998 | Boyer et al. | 707/2 |
| 5,864,842 A | 1/1999 | Pederson et al. | |
| 5,872,904 A | 2/1999 | McMillen et al. | |
| 5,875,334 A * | 2/1999 | Chow et al. | 717/141 |
| 5,884,299 A | 3/1999 | Ramesh et al. | |
| 6,032,144 A | 2/2000 | Srivastava et al. | |
| 6,112,198 A | 8/2000 | Lohman et al. | |
| 6,134,559 A * | 10/2000 | Brumme et al. | 707/103 R |
| 6,226,637 B1 * | 5/2001 | Carey et al. | 707/4 |
| 6,353,821 B1 * | 3/2002 | Gray | 707/2 |
| 6,411,951 B1 * | 6/2002 | Galindo-Legaria et al. | 707/3 |
| 6,449,606 B1 * | 9/2002 | Witkowski | 707/3 |
| 6,505,189 B1 | 1/2003 | On Au et al. | |
| 6,748,392 B1 * | 6/2004 | Galindo-Legaria et al. | 707/102 |
| 6,757,677 B2 | 6/2004 | Pham et al. | |
| 6,865,567 B1 * | 3/2005 | Oommen et al. | 707/2 |
| 7,127,467 B2 * | 10/2006 | Yalamanchi et al. | 707/102 |
| 2003/0088558 A1 * | 5/2003 | Zaharioudakis et al. | 707/3 |
| 2004/0249845 A1 * | 12/2004 | Das | 707/101 |
| 2005/0015361 A1 * | 1/2005 | Payton et al. | 707/3 |
| 2005/0065927 A1 * | 3/2005 | Nouri et al. | 707/4 |
| 2007/0038596 A1 * | 2/2007 | Pizzo et al. | 707/2 |
| 2007/0038618 A1 * | 2/2007 | Kosciusko et al. | 707/4 |
| 2007/0208690 A1 * | 9/2007 | Schneider et al. | 707/2 |

OTHER PUBLICATIONS

Barlow et al., Oracle Database Performance Tuning Guide, 10g Release 1 (10.1), Dec. 2003, Oracle Corp., Chap. 14-19.*
Jarke et al., Query Optimization in Database Systems, Jun. 1984, ACM, pp. 111-143.*
Goetz et al., Microsoft SQL Server 7.0 Query Processor, Sep. 1998, Microsoft Corp., pp. 1-16.*

* cited by examiner

*Primary Examiner* — Rehana Perveen
*Assistant Examiner* — Huen Wong
(74) *Attorney, Agent, or Firm* — Trop, Pruner & Hu, P.C.

(57) ABSTRACT

In a database system, a mechanism is provided to enable parsing of a query into plural objects stored in respective plural tables. One or more characteristics of the query is modified using content of the plural tables based on one or more predefined rules for the purpose of recomposing the query.

26 Claims, 4 Drawing Sheets

PARSING A QUERY

BACKGROUND

A relational database management system stores relational tables, which are accessed by queries according to a standard database query language (such as the Structured Query Language or SQL). Examples of SQL statements include INSERT, SELECT, UPDATE, and DELETE. The SELECT statement is used to retrieve information from the database and to organize information for presentation to a user or an application program. The INSERT statement is used to insert a row (or multiple rows) into a table. The DELETE statement is used to delete a row (or multiple rows) from a table. The UPDATE statement is used to modify or change the content of the table. When a SQL query is received by a database system, a parser interprets the query statement, checks the statement for proper SQL syntax, and evaluates it semantically.

A parser typically includes an optimizer that is able to generate multiple query plans for selection of the most efficient of the query plans. However, plans selected by an optimizer are usually dependent upon the manner in which the query is expressed; in other words, different expressions of the same query may result in generation of different plans by the optimizer. Moreover, a further issue associated with parsing a query is that there may be redundant predicates in the query. Often, an optimizer may not recognize the presence of redundant predicates. Having to process redundant predicates is wasteful of database system resources.

SUMMARY

In general, a mechanism is provided to enable the parsing of a query into plural objects stored in respective plural tables to allow one or more characteristics of the query to be modified for the purpose of recomposing a query having the modified one or more characteristics.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In general, a technique is provided to enable the parsing of a query using an object-oriented database (OODB) system. An OODB system allows for various data structures in the database system to be represented as objects, which can be complex objects. In accordance with some embodiments, using the OODB system, a query is parsed into plural different classes of objects, where each object class is stored in a corresponding table. In one embodiment, a query is parsed (or decomposed) into five different classes of objects and stored in five corresponding tables: a Query table, a Relation table, an Attribute table; and an Expression table. The various objects are related to other objects in the sense that one object of one class may contain identification of another object from another class.

By decomposing the query into the objects of various classes, one or more characteristics of the query can be modified based on the tables corresponding to the objects of different classes. After modification of the one or more characteristics, the query can then be recomposed. The recomposed query is a simplified query where inefficiencies such as redundant predicates have been removed. Also, during modification, independent subqueries are identified to determine which of the independent subqueries can be reused so that redundant execution of independent subqueries can be avoided. Also, the identification of independent subqueries allows for parallel processing of the independent subqueries.

Figure 1:
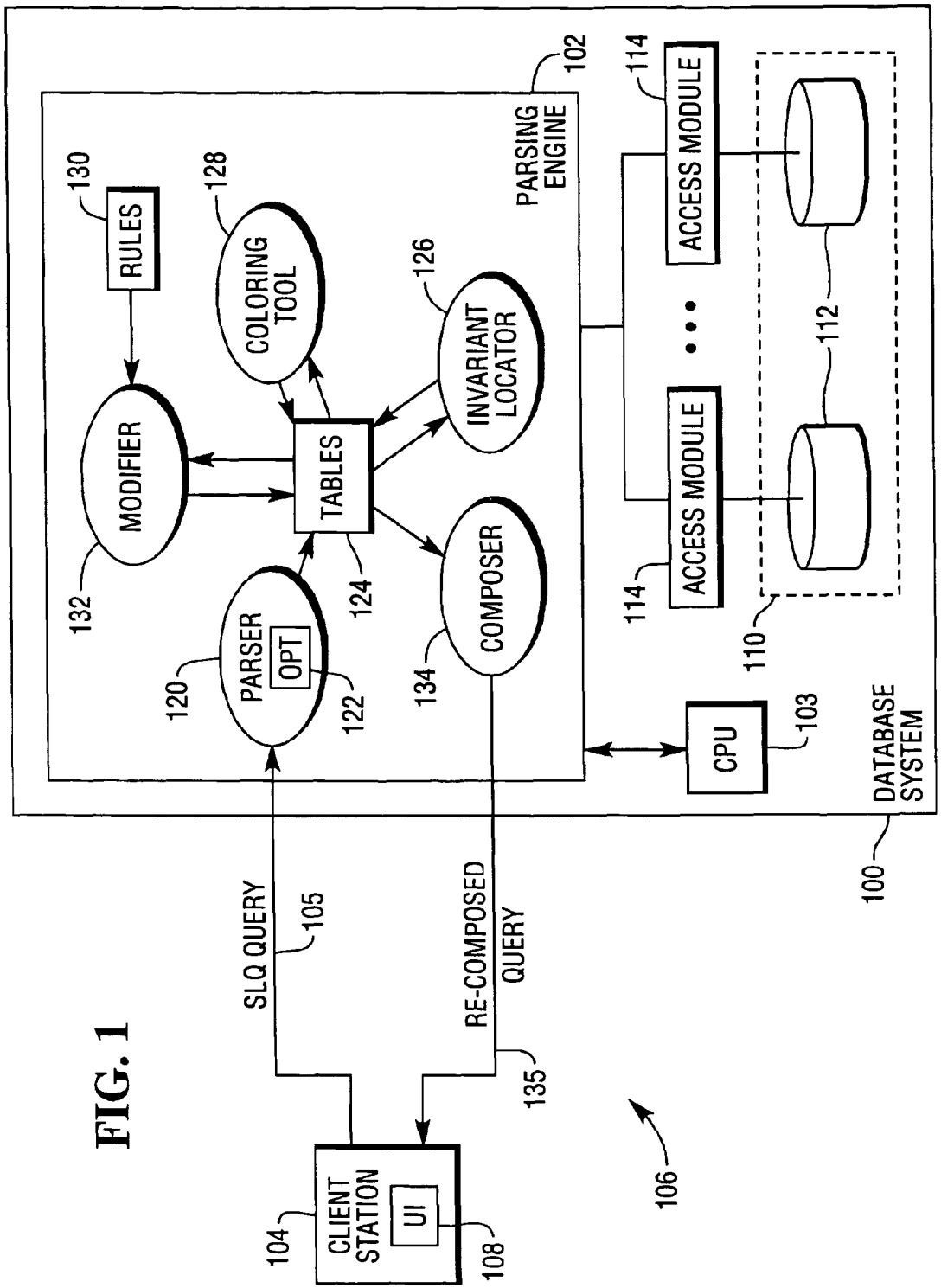
FIG. 1 is a block diagram of an exemplary arrangement including an object-oriented database system that incorporates a parser according to an embodiment of the invention.

Techniques according to some embodiments can be implemented in an example database system 100 depicted in FIG. 1. The database system 100 according to some embodiments includes OODB (object-oriented database) logic 102, which will be described further below. As further depicted in FIG. 1, a client system 104 is coupled to the database system 100 over a data network 106. Examples of the data network 106 include a local area network (LAN), a wide area network (WAN), the Internet, and so forth.

The client system 104 is capable of issuing queries (from a user interface 108 in the client station 104) according to a standard database query language to the database system 100 to access or update data or to create or alter data structures (e.g., tables, rows, and so forth). One example of a standard database query language is the Structured Query Language (SQL), as promulgated by the American National Standards Institute (ANSI).

The database system 100 includes a storage 110 that stores various data, including relational tables. Each relational table contains rows and columns. The storage 110 includes plural storage modules 112 for storing respective portions (groups of rows) of relational tables. In the parallel environment depicted in FIG. 1, the rows of each relational table are distributed across plural storage modules 112. Data in the storage modules 112 can be accessed concurrently by respective access modules 114.

In some embodiments, the access modules 114 are software modules that run on one or plural central processing units (CPUs) 103 of each respective node. Each access module 114 may perform the following tasks: inserts, deletes, or modifies contents of tables; creates, modifies, or deletes definitions of tables; retrieves information from definitions and tables; and locks databases and tables. In one example, each access module 114 is based on an access module processor (AMP) used in some TERADATA® database systems from NCR Corporation. The presence of multiple access modules 114 and corresponding storage modules 112 define a parallel database system.

As further shown in FIG. 1, the database system 100 includes a parsing engine 102 (or plural parsing engines), with each parsing engine having a parser 120. The parser 120 receives database queries (such as those submitted by the client system 104 or from another source) and parses the received query.

The parser 120 includes an optimizer 122 that generates query plans, selecting the most efficient from among the plural query plans. The parser 120 also generates executable steps based on the parsed query and passes the steps for dispatch to the access modules 114.

In accordance with some embodiments of the invention, in response to a query 105 submitted by the client station 104 and received by the parsing engine 102, the parser 120 decomposes the query into multiple objects that are stored in respective tables 124, such as the tables depicted below (including an Attribute table, Expression table, Predicate table, Relation table, Query table). Each table corresponds to a corresponding object class, with a row of the table being an object in the object class. The schemas of the Attribute, Expression, Predicate, Query, and Relation tables, in accordance with an example implementation, are as follows:

| Field | Type | Key | Default |
|---|---|---|---|
| Attribute | | | |
| A_ID | mediumint(10) | PRI | NULL |
| Q_ID | varchar(20) | | |
| R_Name | varchar(20) | | |
| A_Name | varchar(20) | | |
| Alias | varchar(20) | | |
| Expression | | | |
| treeLevelID | mediumint(10) | PRI | NULL |
| Q_ID | varchar(20) | | |
| E_leftCond | varchar(20) | | |
| E_rightCond | varchar(20) | | |
| E_operator | varchar(20) | | |
| Predicate | | | |
| P_ID | mediumint(10) | PRI | NULL |
| Q_ID | varchar(20) | | |
| P_left | varchar(20) | | |
| P_right | varchar(20) | | |
| P_operator | varchar(20) | | |
| Relation | | | |
| R_ID | mediumint(10) | PRI | NULL |
| R_Name | varchar(20) | | |
| Q_ID | varchar(20) | | |
| Query | | | |
| Q_ID | mediumint(10) | PRI | NULL |
| Q_Parent | varchar(20) | | |
| Q_Number | varchar(20) | | |

In the schemas above, prefixes A, Q, R, E, and P represent Attribute, Query, Relation, Expression, and Predicate, respectively. Thus, for example, in the Attribute schema, A_ID represents the identifier of an attribute that is contained in the Attribute table and Q_ID represents the identifier of a query in the Query table. R_Name represents the name of a relational table in which the attribute identified by A_ID is located, and A_Name represents the attributed name identified by the identifier A_ID.

Also, in the Expression schema, treeLevelD is the identifier of the tree level of a particular expression in the query. Note that expressions can be nested in multiple levels of a tree. Also, in the Expression schema, E_leftCond and E_right Cond represent the left and right conditions of the expression that are related by an operator specified by E_operator. An example expression is as follows: $x^2+2x+1<10$, where the operator is the < symbol, and the expression has a left condition and a right condition on either side of the < symbol.

In the Predicate schema, P_ID represents the identifier of the predicate, and P_left and P_right represent the left and right predicates that are related by an operator. (P_operator). An example of P_left and P_right related by P_operator is:

a<b.

Note that predicates can be included in an expression. In the Relation schema, R_ID is the identifier of the relational table, and R_Name is the name of the relational table. In the Query schema, Q_Parent represents the parent of a particular query identified by Q_ID. Note that a particular query can be separated into independent subqueries that are identified by Q_ID, where the subqueries can be nested such that some subqueries are parents of other subqueries. Field_Number represents the number of the particular query (or subquery). In the ensuing discussion, the term "query" is intended to refer to either a main query or a subquery.

The fields provided in each of the schemas represent the columns of the corresponding table, such that a row in the corresponding table contains values assigned to the corresponding fields. Thus, for example, in the Attribute table, the columns are A_ID, Q_ID, R_Name, A_Name, and alias.

Also, in each of the schemas above, the Key field indicates which of the columns of a respective table is used as the primary key (indicated by the "PRI" keyword). For example, in the Attribute schema, the A_ID field is the primary key.

Note that the above is simply provided as a specific example of schemas for corresponding tables. In other implementations, other schemas can be defined.

Figure 2:
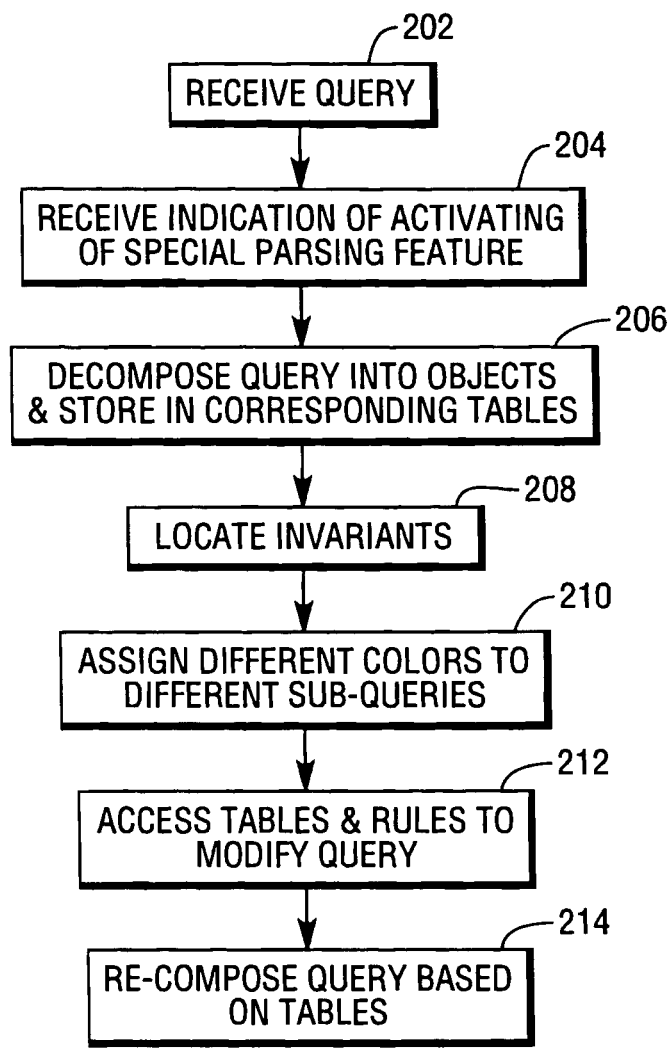
FIG. 2 is a flow diagram of a process performed by the parser, in accordance with an embodiment.

The following discussion refers to both FIGS. 1 and 2, where FIG. 2 shows a process according to an embodiment. As noted above, a query 105 is received (at 202) such as from the client station 104, by the parsing engine 102. The parsing engine 102 also receives (at 204) an indication, such as from a user at the client station 104, of activation of the special parsing feature according to some embodiments. Note that if this indication were not received, then the parsing engine 102 would just parse the received query in a normal manner. The special parsing feature refers to the ability to decompose a query into multiple classes of objects, as discussed above. The remaining tasks of FIG. 2 assume that the indication of activation of the special parsing feature has been received.

The query is then decomposed (at 206) by the parser 120 into objects of the different classes and stored in respective tables, as discussed above. In decomposing the query, subqueries can be encountered, in which case the parser 120 would increment Q_ID for representing the identifier of each subquery in the query. Thus, for example, the Q_ID of the main query can be equal to the value 1. Each time the parser 120 encounters a subquery, the field Q_ID is incremented by 1. Thus, a nested subquery in the main query will have Q_ID equal to 2. This process repeats for each occurrence of a subquery in the main query. In one example, the key word SELECT indicates the presence of another subquery. Thus, for example, a main query can have multiple SELECT keywords to indicate the presence of subqueries.

Next, invariants are located at (208) by an invariant locator 126 in the parsing engine 102. An invariant refers to a part of the query that is constant, such as the expression a=10. A query can be complex with multiple subqueries where the subqueries can be correlated. The invariant locator 124 identifies invariants so that boundaries of a subquery can be determined to enable the subquery to be executed independently.

The invariant locator 124 uses a coloring tool 128 to assign (at 210) different colors to different subqueries that are identified. The different colors assigned to the different subqueries is a user interface feature to allow a user, such as a user at the client station 104, to conveniently view the different subqueries of the query. Thus, a query can be viewed in a top-down manner, starting with the top-level query and drilling down into subqueries of the main query. Alternatively, a query can be viewed in a bottom-up manner, where elimination of subqueries can be observed if the query is simplified, such as by rewriting multiple-nested subqueries to reduce nesting levels. The ability to observe nesting of queries allows a developer, such as a developer at the client station 108, to enhance efficiency of a query by reducing nesting levels of subqueries.

Using predefined rules 130, a modifier 132 accesses (at 212) the tables 124 to find areas of the query that can be simplified. For example, objects can be replaced by the modifier 132 to remove redundancies. Also, the modifier 132 can reduce nesting levels of subqueries to simplify the query.

After modification (which involves modification of the tables 124), the composer 134 recomposes (at 214) the query based on the modified tables 124. It is possible that the rebuilt query may be different from the original query because the tables may have been modified, and the composer 134 attempts to build the simplest form of the SQL query. The recomposed query (135) is sent back to the client station 104 for viewing by the user.

Figure 3:
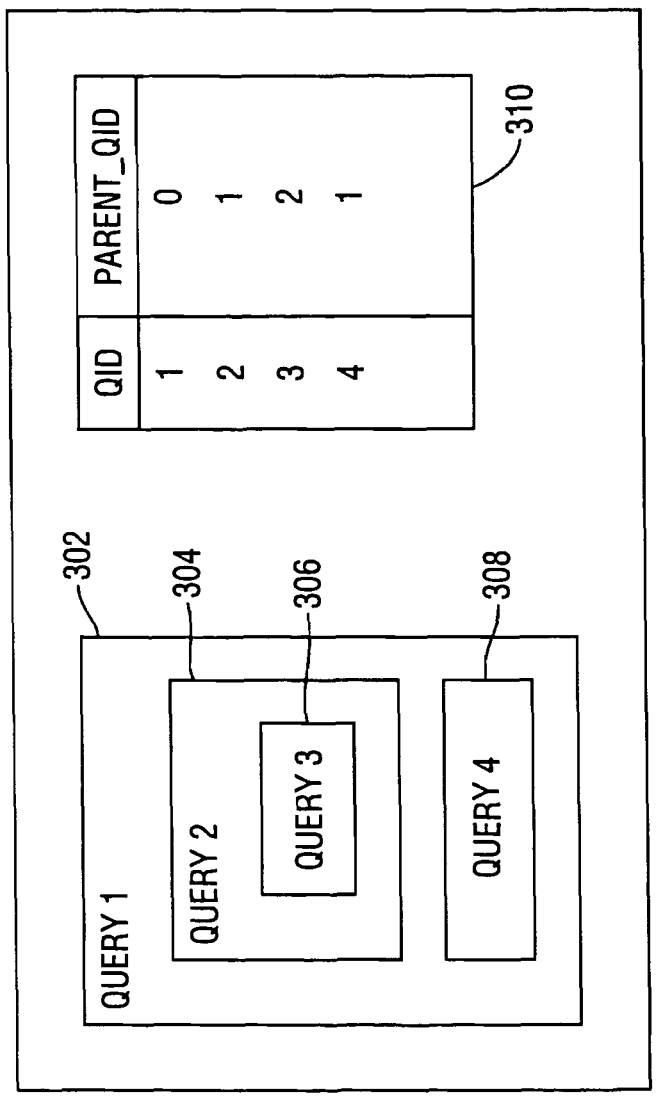
FIG. 3 illustrates nested queries that can be identified by the parser.

FIG. 3 shows an example nesting of queries. In the example of FIG. 3, the main query has Q_ID=1, as represented by the outermost box 302. Within the main query are nested queries 304, 306, and 308 having Q_ID of values 2, 3, and 4. Note that the query 306 having Q_ID of 3 is further nested within the query 304 having Q_ID of 2. Also, a table 310 is maintained that correlates Q_IDs to parent_Q_IDs. Thus, the main query 302, which has Q_ID 1, is correlated to a parent_Q_ID of 0 (in other words, there is no parent for the main query 302). The query 304 having Q_ID 2 has a parent with Q_ID 1. The query 306 with Q_ID 3 has a parent with Q_ID 2. The subquery 308 with Q_ID 4 has a parent with Q_ID 1.

Note that all predicate objects of a particular subquery with Q_ID n will carry Q_ID=n. All relation objects will also have Q_ID=n if they are located within the WHERE clause of query n.

An attribute object may not have the relation within the query that the attribute object resides. In this case, the relation for the attribute object will be the most nested outer query. For example, a predicate in the query 306 (having Q_ID 3) may specify an attribute x. However, x may not be in query 306. To find x, the parsing engine 102 attempts to find x in the next higher nested level (in this case, subquery 304), and if x cannot be found in query 304, to find x in the main query 302.

A specific example of a technique according to an embodiment is provided below. An input query can have the following form:

SELECT T1.a, T2.b as Shell, T1.c, T1.d, T1.e, T1.b, T1.w, T1.z
FROM T1, T2
WHERE ((((T1.a=T1.b AND T1.b=T1.c) AND T1.c=T1.a) AND T1.d=T1.e) AND T1.a=T1.d) OR T1.a=T1.f The expression after the WHERE clause is represented in the following Expression table:

| treeLevelID | Q_ID | E_leftCond | E_rightCond | E_operator |
|---|---|---|---|---|
| 521 | 150 | P920 | P721 | AND |
| 522 | 150 | E521 | P722 | AND |
| 523 | 150 | E522 | P723 | AND |
| 524 | 150 | E523 | P724 | AND |
| 525 | 150 | E524 | P725 | OR |

Note that various specific example values have been assigned to treeLevelID, Q_ID, leftCond, rightCond, and E_operator.

The Predicate table for the above query is as follows:

| predicateID | Q_ID | P_left | P_operator | P_right |
|---|---|---|---|---|
| 720 | 150 | T1.a | = | T1.b |
| 721 | 150 | T1.b | = | T1.c |
| 722 | 150 | T1.c | = | T1.a |
| 723 | 150 | T1.d | = | T1.e |
| 724 | 150 | T1.a | = | T1.d |
| 725 | 150 | T1.a | = | T1.f |

Note that in the above example, there is no nesting of queries, such that only one Q_ID (identifying the main query) is provided. In the Predicate table above, each row contains a specific predicate where P_left (representing one attribute) is related to P_right (representing another attribute) by P_operator (representing a logical operator such as the =operator).

After simplification by removing redundancies, based on rules 130, the modifier 132 produces output tables represented below:

| treeLevelID | Q_ID | E_leftCond | E_rightCond | E_operator |
|---|---|---|---|---|
| 522 | 150 | P721 | P722 | AND |
| 523 | 150 | E522 | P723 | AND |
| 524 | 150 | E523 | P724 | AND |
| 525 | 150 | E524 | P725 | OR |

| predicateID | Q_ID | P_left | P_operator | P_right |
|---|---|---|---|---|
| 721 | 150 | T1.b | = | T1.c |
| 722 | 150 | T1.c | = | T1.a |
| 723 | 150 | T1.d | = | T1.e |
| 724 | 150 | T1.a | = | T1.d |
| 725 | 150 | T1.a | = | T1.f |

Note that both the Expression and Predicate tables have one fewer row than the original corresponding tables. For example, in the original Predicate table, the following predicates were specified:

T1.a=T1.b, T1.b=T1.c, and T1.c=T1.a.

In this example, one of the three predicates is redundant. Thus, the modifier 132 removes the predicate T1.a=T1.b from the Predicate table to produce the modified Predicate table with one fewer row.

The rules 130 can include transitive rules and distributive rules. The example presented above uses a transitive rule to determine that one of the predicates is redundant. In other scenarios, distributive rules can be used for modifying expressions of a query. Using transitive and/or distributive functions, elements can be grouped or clustered to find redundancies or to otherwise reorder a sequence within an expression.

Figure 4:
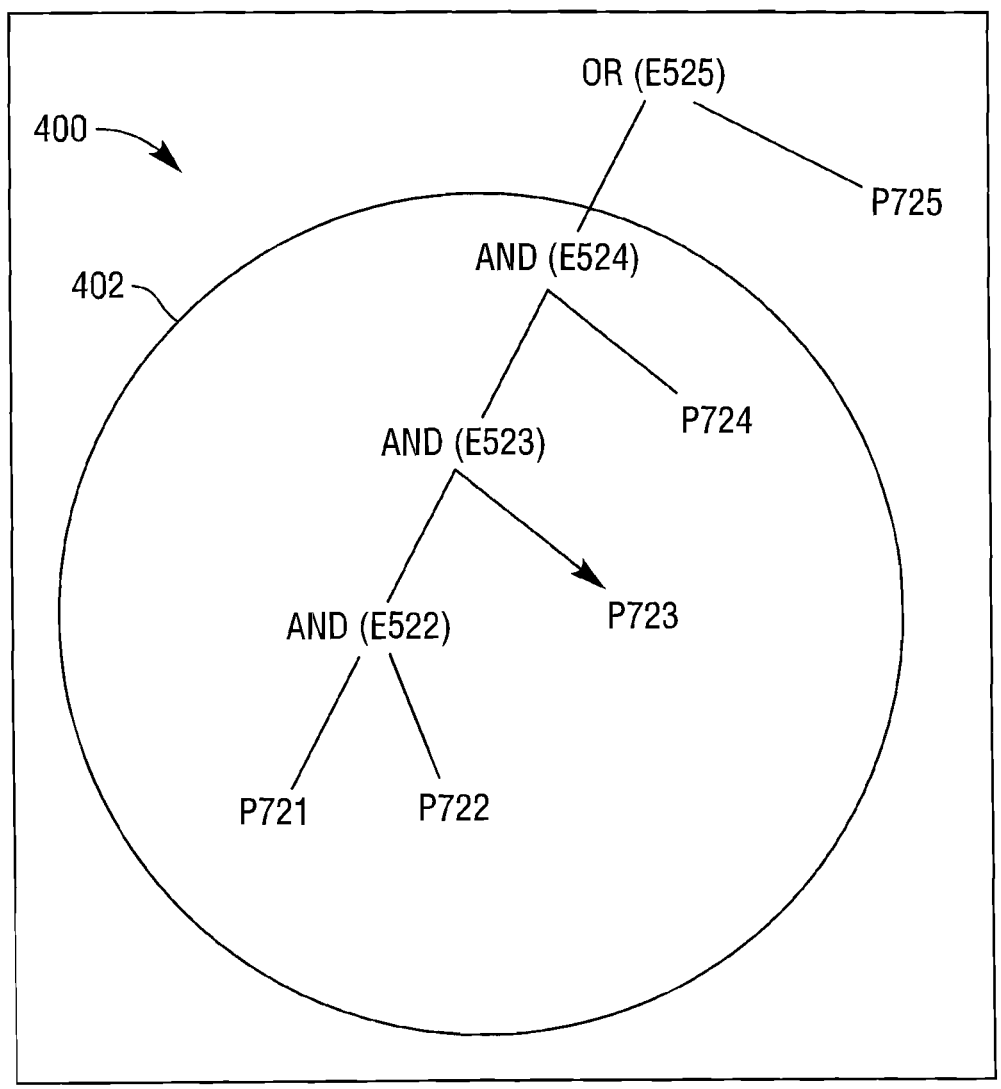
FIG. 4 illustrates clustering of predicates using a transitive rule, according to an example.

One example of clustering is represented in FIG. 4, where the tree 400 represents the predicates and expressions found in the example above. Using transitive operator rules, equality predicates can be clustered (into a cluster 402). Within the cluster 402, redundancies can be identified and removed.

The following is an example of the distributive property of logical OR on logical AND. The parser 120 may prefer AND over OR. Therefore, distribution of OR on AND will be used. Continuing with the previous example, the two tables are changed using the distributive property as follows:

| treeLevelID | Q_ID | E_leftCond | E_rightCond | E_operator |
|---|---|---|---|---|
| 522 | 150 | E529 | E528 | AND |
| 523 | 150 | E522 | E527 | AND |
| 524 | 150 | E523 | E526 | AND |
| 526 | 150 | P724 | P725 | OR |
| 527 | 150 | P723 | P725 | OR |
| 528 | 150 | P722 | P725 | OR |
| 529 | 150 | P721 | P725 | OR |

| predicateID | Q_ID | P_left | P_operator | P_right |
|---|---|---|---|---|
| 721 | 150 | T1.b | = | T1.c |
| 722 | 150 | T1.c | = | T1.a |
| 723 | 150 | T1.d | = | T1.e |
| 724 | 150 | T1.a | = | T1.d |
| 725 | 150 | T1.a | = | T1.f |

The recomposed query that is based on the modified tables can be executed in a more efficient manner.

Thus, as discussed above, the parsing technique according to some embodiments uses the features of an object-oriented database to represent different parts of a query using different object classes (with the objects stored in corresponding tables). By decomposing the query into the multiple parsing tables, the modifier 132 of the parsing engine 102 can be used to simplify the query. The invariant locator 126 is used to identify independent subqueries that can either be executed in parallel (for improved throughput) or to avoid redundant execution of subqueries (where one subquery can be used by other subqueries). Once simplified, the composer 134 recomposes, from the modified tables, a new representation of the query (which is equivalent to the original query, but in simpler form). The coloring tool 128 allows a developer to view a complex structure of a query to better understand the query.

Instructions of the various software routines or modules discussed herein may be stored on one or more storage units in the corresponding systems and loaded for execution on corresponding control units. The control units include microprocessors, microcontrollers, processor cards (including one or more microprocessors or microcontrollers), or other control or computing devices. As used here, a "controller" refers to hardware, software, or a combination thereof. A "controller" can refer to a single component or to plural components (whether software or hardware).

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems are stored in respective storage devices. The instructions when executed by a respective control unit cause the corresponding system to perform programmed acts.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system, comprising:
    parsing, by at least one processor, a received query into plural objects stored in respective plural tables;
    modifying, by the at least one processor, one or more characteristics of the received query based on content of the plural tables according to one or more predefined rules; and
    recomposing, by the at least one processor, a modified query having the modified one or more characteristics.

2. The method of claim 1, wherein modifying the one or more characteristics comprises modifying one or more predicates in the received query.

3. The method of claim 2, wherein modifying the one or more predicates according to the one or more predefined rules comprises modifying the one or more predicates according to a rule to remove redundant predicates.

4. The method of claim 2, wherein modifying the one or more predicates according to the one or more predefined rules comprises modifying the one or more predicates according to a transitive property rule.

5. The method of claim 1, wherein modifying the one or more characteristics comprises modifying an expression of the received query according to a' distributive property rule.

6. The method of claim 1, further comprising:
    identifying invariants in the received query;
    indicating boundaries of subqueries in the received query based on the invariants.

7. The method of claim 6, wherein modifying the one or more characteristics of the received query is in response to user input based on the indicated boundaries of subqueries.

8. The method of claim 6, further comprising displaying the indicated boundaries of subqueries by using color.

9. The method of claim 1, wherein modifying the one or more characteristics comprises modifying at least one of the tables.

10. The method of claim 9, wherein recomposing the modified query is based on the modified at least one table.

11. The method of claim 1, wherein the parsing, modifying, and recomposing are performed by a parsing engine in the database system.

12. The method of claim 1, further comprising identifying nesting of subqueries in the received query.

13. The method of claim 12, further comprising displaying the nested subqueries.

14. An article comprising at least one machine-readable storage medium containing instructions that when executed cause a system to:
    parse a received query into plural objects stored in respective plural tables;
    modify one or more characteristics of the received query based on content of the plural tables according to one or more predefined rules; and
    recompose a modified query having the modified one or more characteristics.

15. The article of claim 14, wherein modifying the one or more characteristics comprises modifying one or more predicates in the received query.

16. The article of claim 15, wherein modifying the one or more predicates according to the one or more predefined rules comprises modifying the one or more predicates according to a rule to remove redundant predicates.

17. The article of claim 14, wherein modifying the one or more characteristics comprises modifying an expression of the received query according to a distributive property rule.

18. The article of claim 14, wherein modifying the one or more characteristics comprises modifying at least one of the tables.

19. The article of claim 18, wherein recomposing the modified query is based on the modified at least one table.

20. A database system comprising:
a processor;
a parser executable on the processor to receive a query and to decompose the received query into plural classes of objects;
a modifier executable on the processor to modify at least one characteristic of the received query based on content of the plural classes of objects; and
a composer executable on the processor to recompose a modified query according to the modified at least one characteristic.

21. The database system of claim 20, further comprising a storage to store plural tables corresponding to the plural classes of objects, wherein information of the decomposed received query is stored in the plural tables,
wherein the modifier is configured to modify at least one of the tables to modify the at least one characteristic, and wherein the composer recomposes the modified query using the modified at least one table.

22. The method of claim 1, further comprising outputting the modified query for viewing by a user.

23. The method of claim 1, wherein parsing the received query comprises parsing a received SQL query, and modifying the one or more characteristics of the received query comprises modifying the one or more characteristics of the received SQL query.

24. The article of claim 14, wherein the instructions when executed cause the system to output the modified query for viewing by a user.

25. The article of claim 14, wherein parsing the received query comprises parsing a received SQL query, and modifying the one or more characteristics of the received query comprises modifying the one or more characteristics of the received SQL query.

26. The article of claim 20, wherein the received query comprises a received SQL query, and the modified query comprises a modified SQL query.

* * * * *